US012161526B2

(12) United States Patent
Dickenson et al.

(10) Patent No.: US 12,161,526 B2
(45) Date of Patent: Dec. 10, 2024

(54) METHOD AND APPARATUS FOR POSITIONING A DENTAL BRACKET ELEMENT

(71) Applicant: DIGITAL ORTHODONTIC SOLUTIONS LTD, York (GB)

(72) Inventors: Gary Dickenson, York (GB); Tim Flood, Ripon (GB); Richard Hall, Ripon (GB)

(73) Assignee: DIGITAL ORTHODONTIC SOLUTIONS LTD, Yorkshire (GB)

( * ) Notice: Subject to any disclaimer, the term of this patent is extended or adjusted under 35 U.S.C. 154(b) by 0 days.

(21) Appl. No.: 17/243,138

(22) Filed: Apr. 28, 2021

(65) Prior Publication Data
US 2021/0244510 A1    Aug. 12, 2021

Related U.S. Application Data

(63) Continuation of application No. 16/300,202, filed as application No. PCT/GB2017/051263 on May 5, 2017, now Pat. No. 10,993,784.

(30) Foreign Application Priority Data

May 9, 2016    (GB) .................................... 1608059
Aug. 3, 2016    (GB) .................................... 1613390
Nov. 28, 2016    (GB) .................................... 1620106

(51) Int. Cl.
*A61C 7/14*    (2006.01)
*A61C 7/00*    (2006.01)
(Continued)

(52) U.S. Cl.
CPC .............. *A61C 7/146* (2013.01); *A61C 7/002* (2013.01); *A61C 7/16* (2013.01); *B33Y 50/00* (2014.12); *B33Y 80/00* (2014.12); *B33Y 10/00* (2014.12)

(58) Field of Classification Search
CPC ........... A61C 7/146; A61C 7/16; A61C 7/002; B33Y 50/00; B33Y 80/00; B33Y 10/00
(Continued)

(56) References Cited

U.S. PATENT DOCUMENTS 3,932,940 A    1/1976    Andren
4,183,141 A *    1/1980    Dellinger ............... A61C 7/146
                                                         433/24

(Continued)

FOREIGN PATENT DOCUMENTS

JP    S51-70096 U    6/1976
JP    10-258070       9/1998
(Continued)

OTHER PUBLICATIONS

European Search Report dated Nov. 23, 2020 issued in European Patent Application No. 20190860.5, 9 pp.
(Continued)

*Primary Examiner* — Matthew M Nelson
(74) *Attorney, Agent, or Firm* — NIXON & VANDERHYE P.C.

(57) ABSTRACT

Certain embodiments of the present invention relate to methods and apparatus for positioning at least one bracket element with respect to a respective tooth of a subject. Particularly, although not exclusively, certain embodiments of the present invention relate to apparatus for positioning at least one bracket element at a desired location proximate to at least one respective tooth of a subject; the apparatus comprising a support body supporting and integrally formed with at least one support arm, the support arm being arranged to locate a respective bracket element at a desired location with respect to a respective tooth; and at least one locating element for locating the support body relative to at least one tooth of a subject.

10 Claims, 12 Drawing Sheets

(51) Int. Cl.
*A61C 7/16* (2006.01)
*B33Y 50/00* (2015.01)
*B33Y 80/00* (2015.01)
*B33Y 10/00* (2015.01)

(58) Field of Classification Search
USPC .............................................................. 433/3
See application file for complete search history.

(56) References Cited

U.S. PATENT DOCUMENTS

| | | | |
|---|---|---|---|
| 5,542,842 A | 8/1996 | Andreiko et al. | |
| 5,711,665 A * | 1/1998 | Adam | A61C 7/16 433/29 |
| 5,863,198 A | 1/1999 | Doyle | |
| 5,902,104 A | 5/1999 | Yamada | |
| 6,123,544 A * | 9/2000 | Cleary | A61C 7/146 433/74 |
| 6,482,002 B2 * | 11/2002 | Jordan | A61C 7/16 433/29 |
| 6,565,355 B2 * | 5/2003 | Kim | A61C 7/145 433/3 |
| 6,616,444 B2 | 9/2003 | Andreiko et al. | |
| 6,846,179 B2 | 1/2005 | Chapouland et al. | |
| 6,905,337 B1 | 6/2005 | Sachdeva | |
| 6,918,761 B2 | 7/2005 | Sachdeva et al. | |
| 7,125,249 B1 * | 10/2006 | Lauren | A61C 7/16 433/29 |
| 8,002,543 B2 | 8/2011 | Kang et al. | |
| 8,439,671 B2 | 5/2013 | Cinader, Jr. | |
| 9,402,695 B2 | 8/2016 | Curiel et al. | |
| 10,028,804 B2 * | 7/2018 | Schulhof | A61C 7/146 |
| 10,314,673 B2 * | 6/2019 | Schulhof | A61C 7/146 |
| 2002/0028417 A1 | 3/2002 | Chapoulaud et al. | |
| 2004/0081935 A1 | 4/2004 | Stockstill | |
| 2004/0175669 A1 | 9/2004 | Abels et al. | |
| 2007/0031775 A1 * | 2/2007 | Andreiko | A61C 7/146 433/24 |
| 2007/0275340 A1 * | 11/2007 | Kopelman | A61C 7/08 433/3 |
| 2009/0098502 A1 | 4/2009 | Andreiko | |
| 2009/0136890 A1 * | 5/2009 | Kang | A61C 7/14 433/10 |
| 2010/0190125 A1 * | 7/2010 | Lee | A61C 7/146 700/118 |
| 2013/0316296 A1 | 11/2013 | Vu et al. | |
| 2014/0255864 A1 * | 9/2014 | Machata | A61C 7/146 433/3 |
| 2014/0329195 A1 * | 11/2014 | Huang | A61C 7/146 433/24 |
| 2014/0349241 A1 * | 11/2014 | Okazaki | A61C 7/146 433/3 |
| 2014/0363782 A1 | 12/2014 | Wiechmann et al. | |
| 2015/0157421 A1 | 6/2015 | Martz et al. | |
| 2016/0074139 A1 * | 3/2016 | Machata | A61C 7/146 433/3 |
| 2016/0095670 A1 * | 4/2016 | Witte | A61C 7/002 433/24 |
| 2016/0113737 A1 | 4/2016 | Wiechmann | |
| 2016/0228214 A1 * | 8/2016 | Sachdeva | G05B 19/4097 |
| 2016/0310239 A1 * | 10/2016 | Paehl | A61C 7/146 |
| 2016/0346063 A1 * | 12/2016 | Schulhof | A61C 7/002 |
| 2016/0346064 A1 * | 12/2016 | Schulhof | B33Y 80/00 |
| 2017/0135792 A1 * | 5/2017 | Webber | A61C 7/146 |
| 2018/0161126 A1 * | 6/2018 | Marshall | A61C 7/146 |

FOREIGN PATENT DOCUMENTS

| | | |
|---|---|---|
| WO | WO 00/36989 | 6/2000 |
| WO | WO 2007/067554 | 6/2007 |
| WO | WO 2007/069881 | 6/2007 |
| WO | WO 2008/017089 | 2/2008 |
| WO | WO 2011/065777 | 6/2011 |
| WO | WO 2015/177235 | 11/2015 |

OTHER PUBLICATIONS

Great Britain Search Report dated Oct. 24, 2016 issued in Great Britain Patent Application No. 1608059.0, 5 pp.
International Search Report dated Sep. 19, 2017 issued in PCT International Patent Application No. PCT/GB2017/051263, 8 pp.
European Examination Report dated Jan. 17, 2023 issued in European Patent Application No. 20190860.5, 5 pp.

* cited by examiner

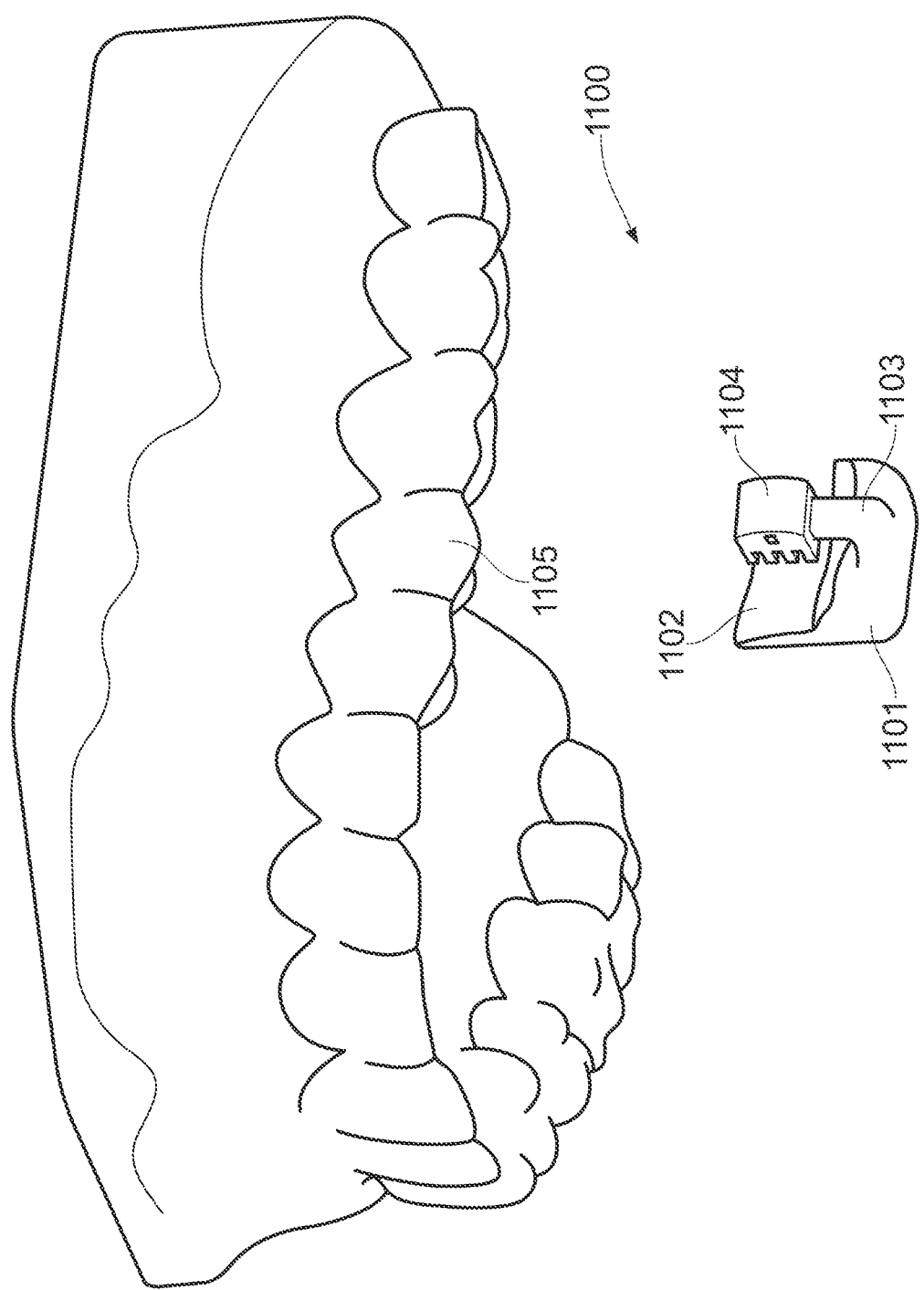

METHOD AND APPARATUS FOR POSITIONING A DENTAL BRACKET ELEMENT

CROSS-REFERENCES TO RELATED APPLICATIONS

This application is a continuation of U.S. patent application Ser. No. 16/300,202, filed Nov. 9, 2018, pending, which is the U.S. national phase of PCT International Patent Application No. PCT/GB2017/051263 filed May 5, 2017 which designated the U.S. and claims priority to Great Britain Patent Application No. 1608059.0 filed May 9, 2016, Great Britain Patent Application No. 1613390.2 filed Aug. 3, 2016 and Great Britain Patent Application No. 1620106.3 filed Nov. 28, 2016, the entire contents of each of which are hereby incorporated by reference.

STATEMENT REGARDING FEDERALLY SPONSORED RESEARCH OR DEVELOPMENT (Not Applicable)

FIELD OF THE INVENTION

Certain embodiments of the present invention relate to methods and apparatus for positioning at least one bracket element with respect to a respective tooth of a subject. Particularly, although not exclusively, certain embodiments of the present invention relate to apparatus comprising a support body and at least one locating element which are for locating bracket elements at respective desired locations accurately and reliably.

BACKGROUND TO THE INVENTION

In recent years, orthodontic treatments have become increasingly common for adults and children. Traditionally, orthodontic treatment comprises the fixing of dental bracket elements on a surface of a tooth by an orthodontist. The orthodontist chooses the location of each dental bracket on a tooth with an aim of achieving a desired movement of the respective tooth. A wire element, known as an arch wire, is threaded between adjacent dental brackets and secured at either end. Once tensioned, the arch wire provides a force causing the teeth to move.

A disadvantage of bracket and arch wire treatments is that they typically require brackets to be positioned and bonded by hand. Performing this correctly requires years of training, is extremely time consuming and, even when care is taken, can often result in incorrectly positioned brackets. This type of procedure is also usually outside the scope of a general dental practitioner and must be performed by a specialist orthodontist.

New types of treatment have become available, such as those that involve sequential removable aligners from companies such as Invisalign®. These treatments do not require an orthodontist to position any brackets and therefore general practitioner dentists can fit these treatment types for patients.

However, for many patients it is still beneficial to use a more traditional bracket and arch wire treatment because it can provide more precise control over tooth alignment and occlusion, larger tooth movements and rotations, and excellent tooth retention post-treatment.

One way of avoiding positioning brackets by hand is by providing a bonding tray, which is a tray shaped to conform to a surface of a patient's teeth and intended to locate bracket elements with respect to the teeth. In this technique, adhesive is applied to brackets and the brackets are friction fitted into the bonding tray. The tray is then fitted over a patient's teeth and the adhesive is cured, which bonds the brackets in place. Finally, the bonding tray is removed by peeling or pulling it away from the patient's teeth and brackets, leaving the brackets in place.

In order to be removable after bonding, bonding trays have to be made from a relatively soft material that allows them to be peeled or pulled away from the teeth. However, this can cause the trays to deform during positioning, meaning that the brackets are not held in position accurately. The action of peeling or pulling the bonding tray away from the teeth can also be problematic because it places a large force on the brackets that can lead to brackets detaching from the teeth.

The shape of bonding trays reduces access to the area where the teeth and brackets meet, making it harder to cure adhesives. Additionally, since adhesive must be applied to brackets before the bonding tray is positioned over the teeth, adhesive can be smeared over the surface of teeth during the subsequent positioning procedure.

Due to the different requirements in terms of their shape and mechanical properties, bonding trays and brackets are typically composed of different materials, manufactured using separate processes and must then be assembled by a lab or dental professional. This can make the manufacturing and fitting processes expensive and time consuming.

It is an aim of certain embodiments of the present invention to at least partly mitigate the above-mentioned problems.

It is an aim of certain embodiments of the present invention to provide an apparatus that improves the accuracy and speed with which bracket elements can be positioned with respect to a patient's teeth.

SUMMARY OF CERTAIN EMBODIMENTS OF THE INVENTION

In a first aspect of the present invention, there is provided apparatus for positioning at least one bracket element at a desired location proximate to at least one respective tooth of a subject; the apparatus comprising:
  a. a support body supporting and integrally formed with at least one support arm, the support arm being arranged to locate a respective bracket element at a desired location with respect to a respective tooth; and
  b. at least one locating element for locating the support body relative to at least one tooth of a subject.

Aptly, the apparatus further comprises at least one bracket element, the bracket element comprising a tooth facing surface securable to a surface of a respective tooth. In certain embodiments, the support body and at least one support arm is integrally formed with the at least one bracket element.

In certain embodiments, the at least one support arm has a first end portion and a further end portion, and further wherein the first end portion is locatable adjacent to an outwardly facing surface of a respective bracket element. In certain embodiments, the first end portion is locatable adjacent to a lower edge surface of a respective bracket element.

In certain embodiments, the further end portion is integrally formed and adjacent to the support body. Aptly, the at least one locating element is configured to be locatable over a tooth or portion thereof of a subject. In certain embodiments, the at least one locating element is a first locating element and the apparatus further comprises a further locating element.

Aptly, the first locating element is provided adjacent to a first end portion of the support body and the further locating element is provided adjacent to a further end portion of the support body. In certain embodiments, the first locating element is locatable over a molar tooth or portion thereof of a subject. Optionally, the further locating element is locatable over an incisor tooth or portion thereof of a subject.

In certain embodiments, the at least one locating element comprises a surface shaped to correspond with at least one surface selected from an occlusal, lingual, facial, distal, or medial surface of a tooth of a subject.

In certain embodiments, the at least one locating element comprises a region of the support body. Aptly, the region of the support body is an edge portion of the support body.

In certain embodiments, the apparatus comprises at least three locating elements, each locating element being spaced apart from each further locating element.

In certain embodiments, the apparatus comprises a first locating element locatable over a molar tooth of a first quadrant of a subject's teeth set and a second locating element locatable over a molar tooth of a further quadrant of a subject's teeth set. In certain embodiments, the apparatus further comprises a third locating element located between the first locating element and second locating element.

Thus, in certain embodiments, the apparatus provides a carrier element and a plurality of bracket elements which are locatable to a first and further quadrant of a subject's teeth set.

In certain embodiments, the apparatus is configured to locate at least 12 bracket elements to the upper or lower dental arch.

In certain embodiments, the support body comprises at least one through hole, each through hole being located within a respective support arm, wherein each through hole provides a fluid communication passageway between a tooth facing surface of a respective bracket element and an outer facing surface of the support body.

In certain embodiments, the at least one bracket element comprises a through hole for providing a fluid communication passageway between a tooth facing surface and an outer facing surface of the bracket element.

Optionally, the through hole is configured to provide a fluid communication pathway for a curable adhesive composition.

In certain embodiments, the at least one bracket element comprises a passageway configured to accommodate a wire element.

In certain embodiments, the passageway is configured to extend from a first side edge to a second side edge of the bracket element, wherein optionally the passageway is selected from a through hole and a slot.

Optionally, the at least one bracket element comprises at least one subject-specific characteristic. The characteristic may be for example a contour of a surface of the bracket element. In certain embodiments, the subject-specific characteristic is a contour of a tooth facing surface of the bracket element, and wherein the contour corresponds with an outer-facing surface of a tooth of a subject.

In certain embodiments, the subject-specific characteristic is a thickness of the bracket element. In certain embodiments, the subject-specific characteristic is a location of a passageway formed in the bracket, the passageway being configured to accommodate a wire element. In certain embodiments, the subject-specific characteristic is a dimension of the passageway. The dimension may be for example a width and/or depth of the passageway. In certain embodiments, controlling the dimensions of the passageway provides the advantage of being able to apply torque to the tooth to which the bracket is applied immediately after attachment of the bracket element to the tooth.

In certain embodiments, the subject-specific characteristic is a shade or colour of the bracket element. Aptly, the bracket element is shaded or coloured to substantially match a tooth of a subject to which the bracket element is to be adhered. In one embodiments, each bracket element has the same shade or colour. In an alternative embodiment, a bracket element may have a different shade or colour to a further bracket element comprised in the apparatus.

As described herein, the apparatus comprises an integrally formed support body and at least one support arm. Aptly, the apparatus is obtainable by a fabrication process. In certain embodiments, the apparatus is obtainable by an additive manufacturing process.

Optionally the apparatus is obtainable by a process selected from fusion deposition modelling, stereolithography, multi-jet modelling, sintering e.g. laser sintering, inkjet printing and electron beam melting.

In certain embodiments, the apparatus or portion thereof is composed of or comprises a curable material e.g. a curable polymeric material. In certain embodiments, the apparatus or portion thereof is composed of or comprises a ceramic material.

In certain embodiments, the apparatus or portion thereof is composed of a metal material. In certain embodiments, the apparatus is formed from an anodized metal material. In certain embodiments, the apparatus comprises at least one bracket element integrally formed with the support arm and is formed from a single material. Aptly, the single material is a metal e.g. cobalt chrome (an alloy of cobalt and chromium) or steel. The metal material may be anodized metal material. Anodized metal material can be provided in a number of colours and therefore in certain embodiments, the apparatus, including e.g. one or more brackets, is red, blue, green, purple, grey, black, orange etc. In certain embodiments, the apparatus may be matched to a patient's tooth colour.

In certain embodiments, the metal material is an electropolished material.

In certain embodiments, the apparatus is composed of polyether urethane. In certain embodiments, the apparatus is composed of a co-polymer comprising polyether urethane. The co-polymer may comprise polyether urethane and polyurethane. In certain embodiments, the apparatus comprises at least one bracket and is composed of a single material. In certain embodiments, the single material is a co-polymer of polyether urethane and polyurethane.

In certain embodiments, the at least one support arm comprises a first end portion and a second end portion with an aperture located therebetween, the aperture being configured to locate a respective bracket element with respect to a respective tooth of a subject.

In certain embodiments, the apparatus comprises a hinge portion between at least one support arm and a region of the support body adjacent to the at least one support arm. In certain embodiments, the hinge portion is comprised as part of a support arm.

In certain embodiments, the apparatus comprises a plurality of hinge portions, each hinge portion being arranged between a support arm and a respective region of the support body adjacent to the support arm.

In certain embodiments, the present invention provides a carrier which is capable of locating one or more dental bracket elements in a predetermined position. Thus, the apparatus of certain embodiments can be used to locate one or more dental bracket elements in a location with respect to a tooth which is predetermined to cause movement of the teeth in a desired direction. Certain embodiments therefore reduce the need for the dentist or orthodontist to consider the position of each dental bracket element.

In certain embodiments, the apparatus described herein can be produced based on information obtained from the patient's oral cavity e.g. by way of an intra-oral scan or an impression taken of one or both of the patient's dental arches or portions thereof.

Furthermore, the apparatus of certain embodiments provides a support body integrally formed with at least one support arm configured to locate one or more bracket element in a predetermined desired location with respect to a tooth of a patient. Thus, certain embodiments enable one or a plurality of dental brackets to be located ready to be located in a desired location prior to treatment of the patient.

In a further aspect of the present invention, there is provided a method of manufacturing an apparatus for positioning at least one bracket element at a respective desired location proximate to a tooth of a subject, comprising the steps of:
  providing a digital model representing a dental structure of a subject;
  providing a position for at least one bracket element on the digital model;
  obtaining a configuration of at least one locating element for locating the support body relative to at least one tooth of a subject and a support body supporting and integrally formed with at least one support arm, each support arm being arranged to locate a respective bracket element at a desired location with respect to a respective tooth;
  using the digital model to fabricate the support body, the spaced-apart support arm and the at least one locating element.

In certain embodiments, the method further comprises intra-orally scanning a dental structure of a subject prior to providing the digital model.

In certain embodiments, the method further comprises creating an impression of a dental structure of a subject prior to providing the digital model.

In certain embodiments, the step of fabricating further comprises fabricating at least one bracket element. In certain embodiments, the step of fabricating the at least one bracket element comprises determining a dimension of a passageway formed in the bracket element, the passageway being configured to accommodate a wire element. In certain embodiments, the dimension is the depth and/or width of the passageway. In certain embodiments, the method further comprises fabricating at least one bracket element with a passageway having a predetermined dimension. The dimension is aptly subject-specific.

Aptly, the step of fabricating further comprises forming the support body, the at least one support arm, the at least one locating element and the at least one bracket element as a single piece.

In certain embodiments, the step of fabricating comprises fabricating by an additive layer manufacturing process.

Aptly, the apparatus is the apparatus of the first aspect of the invention.

In a further aspect of the present invention, there is provided a method of positioning at least one bracket element at a respective desired location proximate to at least one respective tooth of a subject, comprising the steps of:
  locating a support body proximate to at least one tooth of a subject using at least one locating element;
  wherein the support body supports and is integrally formed with at least one support arm, each support arm being arranged to locate a respective bracket element at a desired location with respect to a respective tooth.

Aptly the method comprises locating an apparatus according to the first aspect of the invention proximate to at least one tooth of a subject, wherein the step of locating comprises positioning at least one locating element over a tooth or portion thereof of a subject.

In certain embodiments, the method further comprises securing a bracket element to a respective tooth, wherein optionally the step of securing comprises providing a curable composition to a tooth facing surface of the bracket element and curing the composition in a desired location on the tooth facing surface.

In a further aspect of the present invention, there is provided apparatus for aligning a tooth of a subject, the apparatus comprising:
  a subject-specific bracket element.

In certain embodiments, the bracket element comprises a tooth-facing surface which comprises at least one characteristic which corresponds to a characteristic of a surface of a tooth of a subject.

In certain embodiments, the tooth-facing surface comprises a contour which corresponds to a contour of the surface of the tooth to which the apparatus is configured to be secured.

In certain embodiments, the bracket element comprises a thickness which is a subject-specific thickness. In certain embodiments, the bracket element comprises a passageway, and wherein a location of a passageway of the bracket element is subject-specific, the passageway being configured to accommodate a wire element.

Aptly the bracket element is formed by a fabrication method. Aptly, the bracket element is formed by an additive fabrication process. A subject-specific bracket element according to certain embodiments may offer the advantage that the tooth-facing surface thereof conforms to the tooth surface to which the bracket element is to be attached. Thus, the bracket element may conform better to the contours of the tooth than a non specific bracket element, therefore ensuring better bonding to the tooth.

In a further aspect of the present invention, there is provided a kit comprising an apparatus as described herein and a wire element, wherein the wire element is located in a passageway of a bracket element. In certain embodiments, the kit further comprises a three dimensional model of a subject's teeth or portion thereof.

Certain well-known terminology is used herein including the following terms:

As used herein, the term "dental arch" typically refers to an arrangement of teeth in a jaw of a subject. Thus, mammals such as humans have two dental arches, one located in the upper jaw and one located in the lower jaw. Reference may be made to a dental quadrant, which relates to a portion of a dental arch. A subject is likely to have four quadrants: the upper dental arch being composed of two quadrants and the lower dental arch being composed of two quadrants.

As used herein, the term "facial surface" may refer to a surface of a tooth facing towards the lip or cheek of a subject or patient.

As used herein, the term "lingual surface" can refer to a surface of a tooth facing towards the tongue of a subject or patient.

As used herein, the term "occlusal surface" can refer to a surface of a tooth that faces a tooth of an opposing dental arch of a subject or patient.

As used herein, the term "mesial surface" can refer to a surface of a tooth towards the midline of a subject's teeth or patient.

As used herein, the term "distal surface" can refer to a surface of a tooth facing away from the midline of a subject's teeth or patient.

As used herein, the term "bracket" can refer to a component that can be fixed to a patient's teeth and used in combination with an arch wire to move the teeth. The terms "bracket" as used herein is interchangeable with the terms "dental bracket", "dental bracket element" and "bracket element". A bracket element is configured to be secured to a respective tooth for a prolonged period of time e.g. weeks, months or even years.

As used herein, the term "bonded" refers to the process of securing a component such as for example a bracket element to a surface e.g. a surface of a tooth. The component is bonded to the surface permanently or semi-permanently, e.g. using an adhesive. The adhesive may be curable by light to further bond the component to the surface.

As used herein, the term "orthodontic" refers to a class of treatments aimed at altering the position of one or more of a subject's teeth. The term may encompass treatment which is aimed at moving a patient's teeth which are misaligned as a result of the patient's oral anatomy. In certain embodiments, the apparatus may be used to move a patient's teeth which are misaligned due to oral disease (which may be referred to as periodontic treatment). In certain embodiments, the apparatus may be used to prevent movement of a patient's teeth and there is a preventive treatment.

DETAILED DESCRIPTION OF EMBODIMENTS OF THE INVENTION

Embodiments of the present invention will now be described hereinafter, by way of example only, with reference to the accompanying drawings in which:

FIG. 12 illustrates the apparatus illustrated in FIG. 11 before being located with the tooth.

In the drawings like reference numerals refer to like parts.

Figure 1:
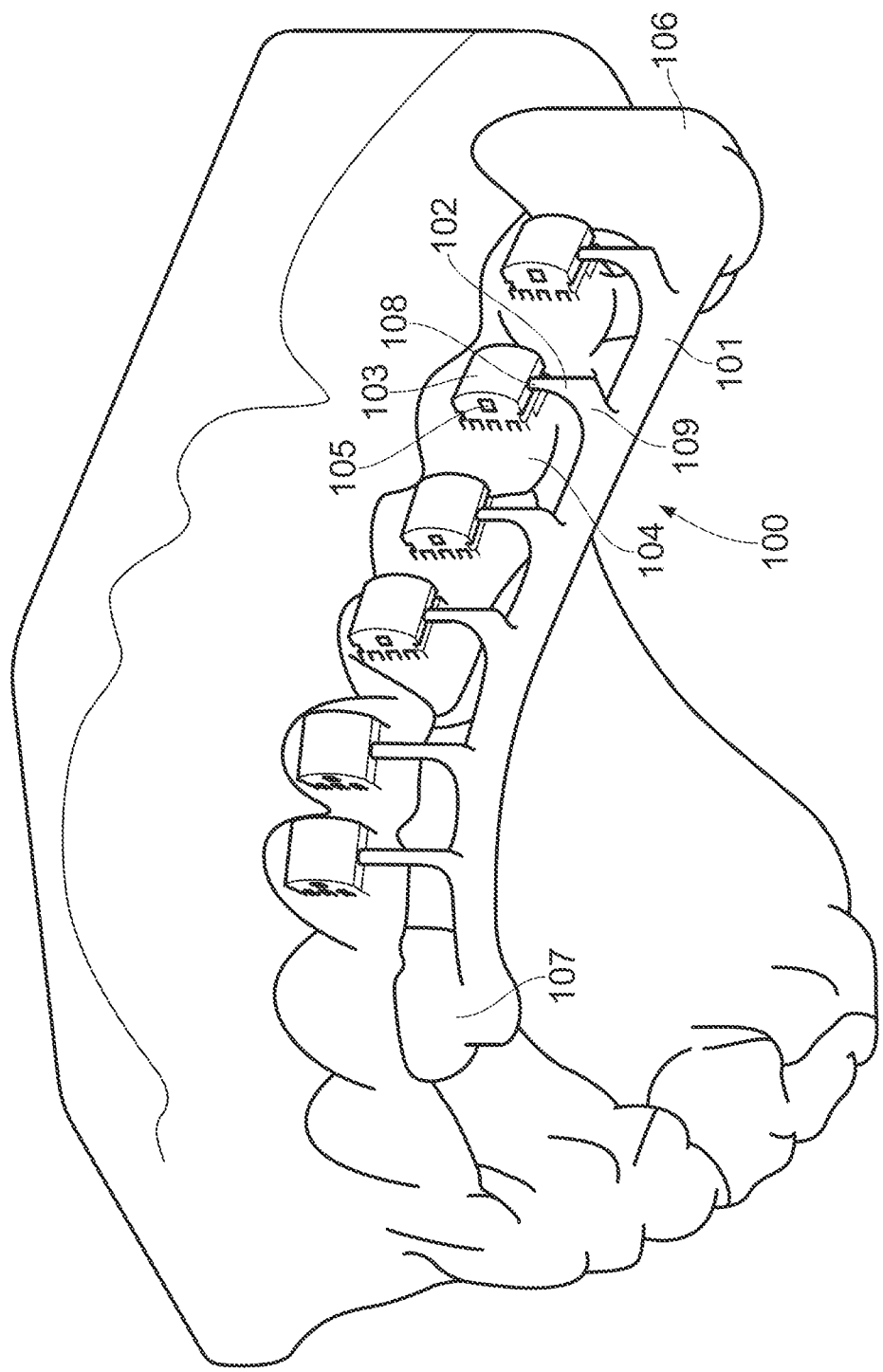
FIG. 1 illustrates apparatus for positioning bracket elements with respect to the teeth of a subject according to certain embodiments of the present invention.

Referring to FIG. 1, there is provided apparatus 100 comprising a support body 101. In certain embodiments, the apparatus 100 may be considered a carrier element for locating one or more bracket elements in a predetermined position.

In the embodiment of FIG. 1, the support body 101 comprises a plurality of support arms 102, each of which is arranged to locate a respective bracket element 103 at a desired location with respect to a respective tooth 104. The support arms may extend generally orthogonally from the support body. The desired location of the bracket element may be a location on a facial surface of a tooth that causes movement of the tooth when force is applied as part of an orthodontic treatment. The force may be applied by a wire element (not shown) which passes through a bracket element to an adjacent bracket element and is secured according to known methods.

It will be understood that while the following embodiments are described in the context of positioning bracket elements with facial surfaces of the teeth, depending on the type of orthodontic treatment prescribed, certain embodiments can be used to position bracket elements with lingual surfaces of the teeth.

The support body 101 supports and is integrally formed with the support arms 102. In the illustrated embodiment, each of the one or more bracket elements 103 is also integrally formed with the supports arms and the support body. Thus, aptly, the bracket elements, the support arms and the support body are formed from a single piece of material. Aptly, the bracket elements, the support arms and the support body are formed from the same type of material. In certain embodiments, the bracket elements, the support arms and the support body are formed from more than one material in a single piece.

As shown in FIG. 1, there may be provided a plurality of bracket elements 103. Each bracket element 103 comprises a tooth facing surface (not shown) securable to a surface of a respective tooth 104. In use, the bracket element 103 may be securable to a tooth by applying a curable adhesive to a tooth facing surface of the bracket element 103, positioning the bracket element in contact with a tooth surface, and curing the adhesive, which bonds the bracket element to the tooth.

The support arms 102 are configured so that they may be separated from the support body 101 and/or bracket elements 103, such as by being broken, cut or snapped. This may enable a dental practitioner to locate the dental bracket elements correctly in position of a surface of the tooth whilst the dental brackets integrally formed with the remainder of the apparatus. Once a bracket element has been located in the desired position and subsequently bonded to a respective tooth, the dental practitioner may then separate the dental bracket element from the remainder of the apparatus by cutting through the respective support arm.

Figure 5:
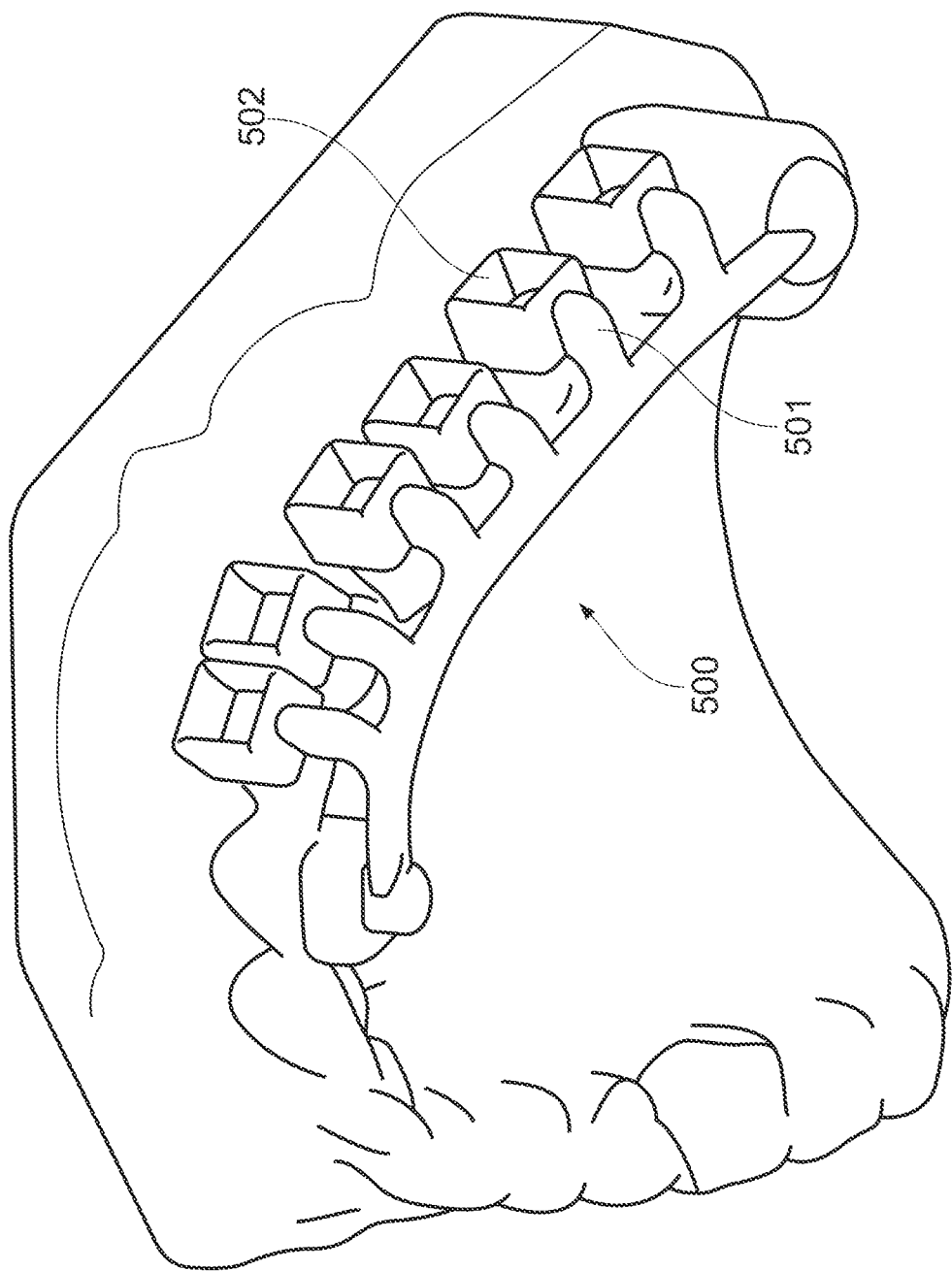
FIG. 5 illustrates an alternative embodiment of the apparatus.

However, certain embodiments have bracket elements that are separate from the support arms. An example of such an arrangement is shown in FIG. 5.

There are a number of different types of bracket elements available and the exact nature of the bracket element is not essential. The bracket elements may be configured according to bracket types known in the art such as self-ligating or non-self-ligating brackets. Non self-ligating brackets are typically attached to an arch wire using elastic ligatures, whereas self-ligating brackets have a passageway which the arch wire passes through, combined with a moveable part within each bracket element which exerts a force on the arch wire. Furthermore, the bracket element may comprise for example flat tooth-facing surfaces or may comprise contoured tooth-facing surfaces. In certain embodiments, the bracket elements may be subject-specific, that is to say, the bracket element comprises at least one characteristic which is patient-specific and based on information gathered from a particular patient.

As described, the bracket element 103 may comprise a passageway 105 configured to accommodate a wire element. The passageway allows a wire element such as an arch wire to pass through the bracket element 103. The passageway 105 may be configured to extend from a first side edge to a second side edge of the bracket element 103, and optionally may be selected from a through hole and a slot. The passageway may provide a linear or non-linear path e.g. a Z-shaped pathway for the wire element to be located through the bracket element 103.

The support arm 102 may comprise a first end portion 108 and a further end portion 109. The first end portion 108 is attached to and continuous with an outwardly facing surface of a respective bracket element 103. The outwardly facing surface may be a lower edge surface of the bracket element 103. In certain embodiments, the attachment of a support arm to the lower surface of a respective bracket element may improve access around the bracket elements and teeth, allow brackets elements to be removed after bonding, and improve subject comfort by reducing contact between the inside of a subject's mouth and uneven surfaces of the bracket element. In other embodiments, however, it is envisaged that the support arm may be attached to and integrally formed with a different surface of the bracket element, e.g. a facial (outwardly facing) surface thereof.

As shown in FIG. 1, the apparatus 100 further includes at least one locating element 106 for locating the support body 101 relative to a plurality of teeth. The locating element 106 ensures that the support body 101 is located correctly with respect to the teeth, which ensures that the support arms 102 locate their respective bracket elements 103 in the desired positions with respect to the teeth. The locating element 106 may be configured to be locatable over a tooth or portion thereof of a subject. The locating element 106 may comprise a surface shaped to correspond with an occlusal, lingual, facial, distal or mesial surface of a tooth of a subject. That is, the locating element 106 may be subject-specific in that it has a surface that is shaped to correspond with a surface of the tooth of a subject. Aptly, the locating element may be shaped to correspond with two or more surfaces of a tooth. This may improve the positional accuracy and stability of the locating element 106 with respect to the teeth.

The apparatus of FIG. 1 comprises a locating element 106 which is a first locating element and a further locating element 107. The first locating element 106 may be provided adjacent to a first end portion of the support body 101 and the further locating element 107 may be provided adjacent to a further end portion of the support body 101. The first locating element 106 may be locatable over part or the majority of a molar tooth of a subject. In FIG. 1, the first locating element 106 is located over a portion of an occlusal, lingual, facial and distal surface of a molar tooth.

The further locating element 107 may be locatable over part or the majority of an incisor tooth of a subject. In FIG. 1 the further locating element 107 is located over a portion of an occlusal and lingual surface of an incisor tooth. In certain embodiments, providing more than one locating element increases the positional accuracy of bracket elements with respect to the teeth. This may be particularly advantageous when an elongate support body is used (e.g. when several bracket elements are being positioned at once).

Aptly, the first and further locating elements 106, 107 may be located on a number 1 and number 6 tooth, or a number 1 and number 7 tooth of a dental quadrant respectively, the numbering according to Palmer notation. The number 1 tooth may be a tooth from the same or an adjacent dental quadrant to the number 6 or 7 tooth. As known in the art, Palmer notation requires the teeth of a particular dental quadrant to be numbered from the midline outwards, for example the left central incisor would be tooth number 1 and the left rearmost molar would be tooth number 8 (or 7 depending on the subject's dental anatomy). Certain embodiments can allow brackets to be positioned one dental quadrant at a time, which can substantially reduce the time it takes to fix brackets to the teeth.

It will be understood that alternatively to positioning brackets one dental quadrant at a time, certain embodiments could be used to position various numbers and combinations of brackets, for example to position a bracket with a single tooth or to position brackets on a majority or all of the teeth in a dental arch. In this and other embodiments, various numbers and configurations of locating elements may be provided, such as only providing a single locating element or providing an intermediate locating element between first and further locating elements (i.e. more than two locating elements).

As noted above, the support body 101, support arms 102 and locating elements 106, 107 may be integrally formed by a technique known in the art. That is, some or all of the components of the apparatus may be made as a single part. This may simplify the process of manufacturing the apparatus. Furthermore, the apparatus can be produced directly from computer files generated from information gathered on individual patients.

The apparatus 100 may be composed of or comprise a curable material such as a curable polymeric material. Aptly, the material may be polyether urethane. The apparatus may be composed of or comprise a ceramic or a metal material. The material may be a stable, non-reactive or bio compatible material.

The apparatus material may have a Shore hardness of around D1 87 when tested according to ISO 868. The apparatus material may have a tensile modulus of around 2700 MPa when tested according to ISO 527. The apparatus material may have a flexural modulus of around 2100 MPa when tested according to ISO 178. The apparatus material may have a flexural strength of around 102-105 MPa when tested according to ISO 178. The apparatus material may have a tensile strength of around 72-75 MPa when tested according to ISO 527.

Certain embodiments may be integrally formed and composed of more than one material. In such embodiments, the type of material may be chosen for each region of the apparatus based on the functional requirements of that region. Suitable processes for this include so called multiple material additive manufacturing processes.

Figure 2:
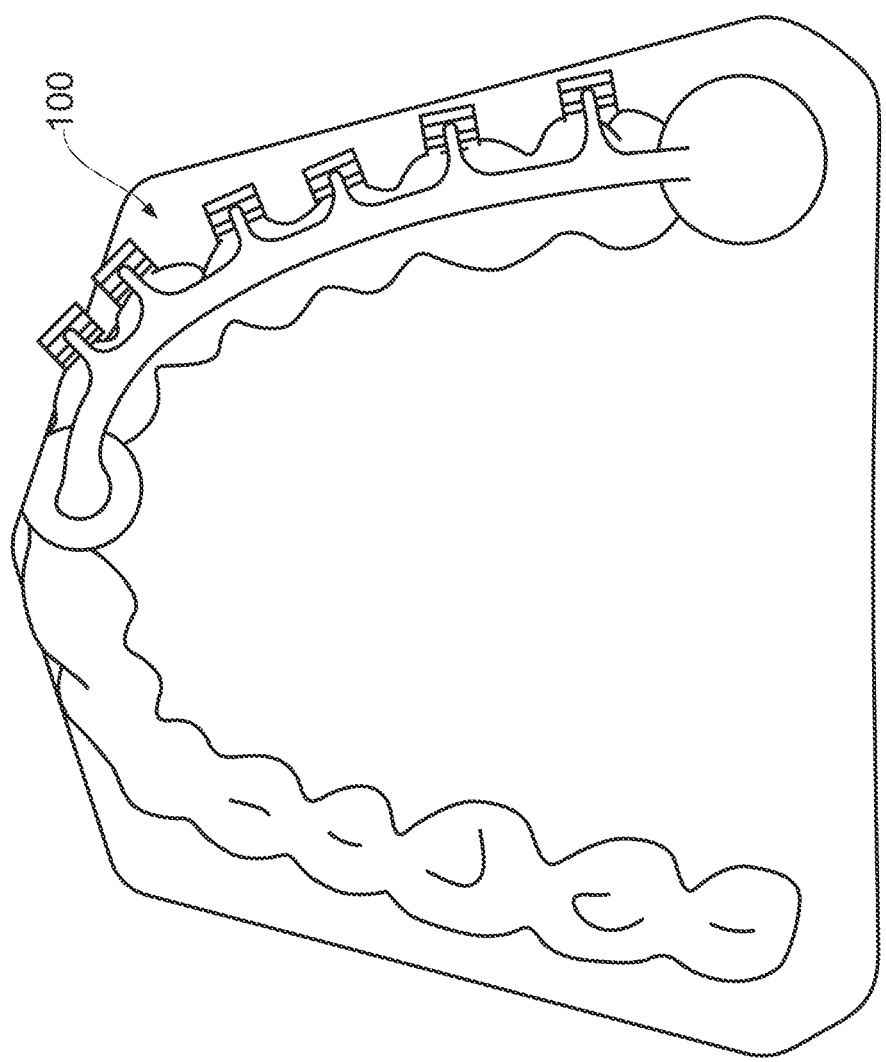
FIG. 2 illustrates an alternative view of the apparatus illustrated in FIG. 1.

FIG. 2 illustrates an occlusal facing view of the apparatus 100 described in FIG. 1.

Figure 3:
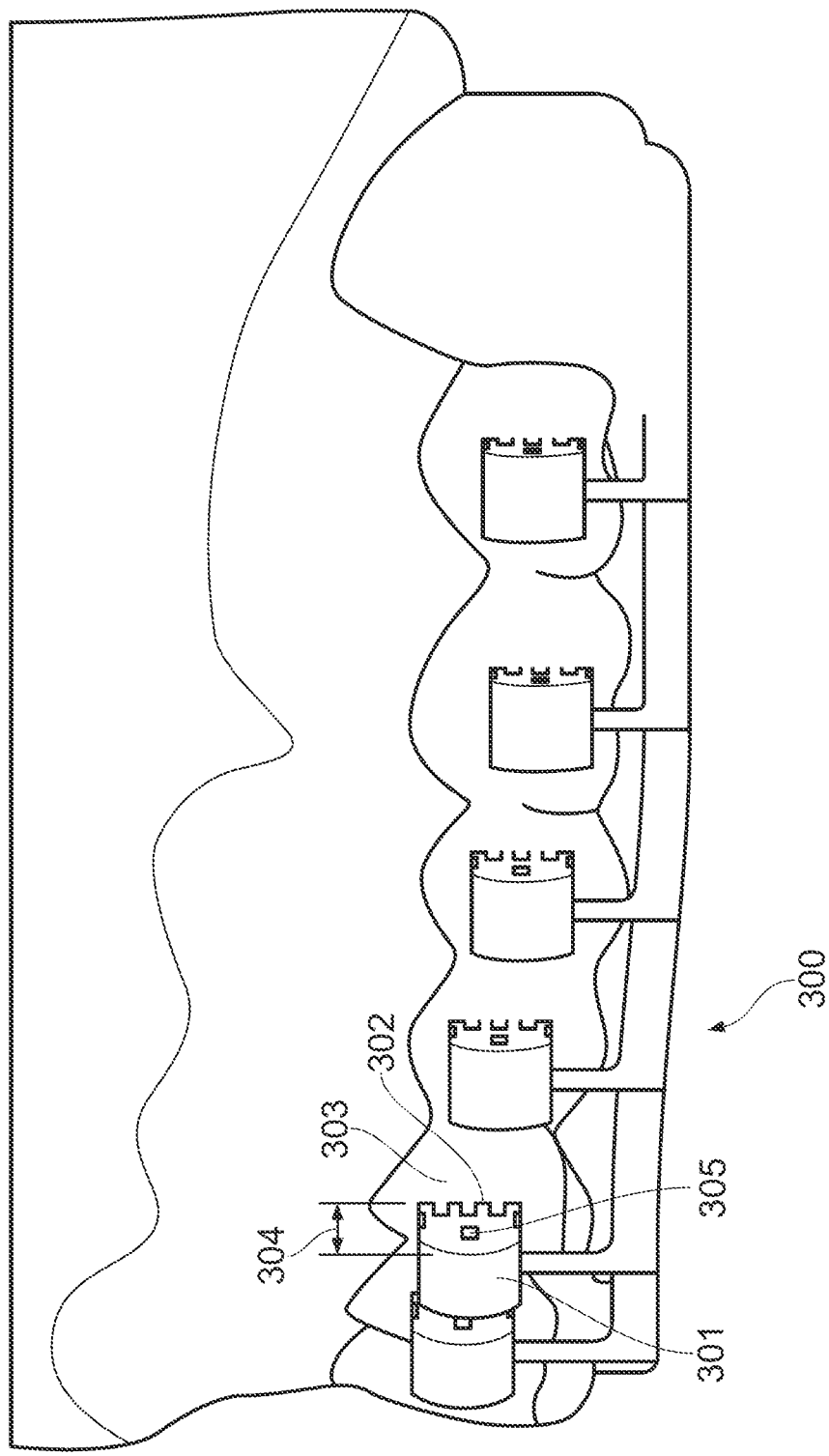
FIG. 3 illustrates an alternative embodiment with a subject-specific bracket element.

Referring now to FIG. 3, there is provided a bracket element 301 comprising at least one subject-specific characteristic. This characteristic may be a contour of a surface of the bracket element 301. The contour may be a contour of a tooth facing surface 302 of the bracket element which corresponds with an outer facing surface of a tooth 303 of a subject. This may improve bonding strength between the bracket 301 and the tooth 303 because their respective surfaces have a larger surface area of contact as compared to a flat, non-contoured surface.

The subject-specific characteristic may be a thickness 304 of the bracket element 301. Providing a bracket element 301 with a subject-specific thickness can account for different subject occlusions and can allow the movement of each tooth to be controlled more precisely.

Alternatively or in addition, the subject-specific characteristic of the bracket element 301 may be a location of a passageway 305, the passageway 305 being configured to accommodate a wire element. This may allow more control over movement by allowing a tooth to be moved rotationally and/or occlusionally by providing a force offset from the axis of a subject's dental arch.

In certain embodiments, the apparatus comprises one or more bracket elements which colour or shade is chosen to substantially match the colour or shade of a tooth or plurality of teeth of a subject to which the bracket element is to be adhered. In certain embodiments, the bracket elements for locating on teeth in an upper tooth set may be a different shade or colour to the bracket elements which are for location on teeth in a lower tooth set.

The shade of the subject's teeth may be determined by comparison of the patient's teeth with a shade guide. Alternatively, or in addition, dot-capture systems, e.g. those incorporating a spectrophotometer may be used and the results inputted into the fabrication system. Other systems which have utility include whole-tooth capture systems e.g. scanner systems based on colourimeters. Such systems are known in the art.

Figure 4:
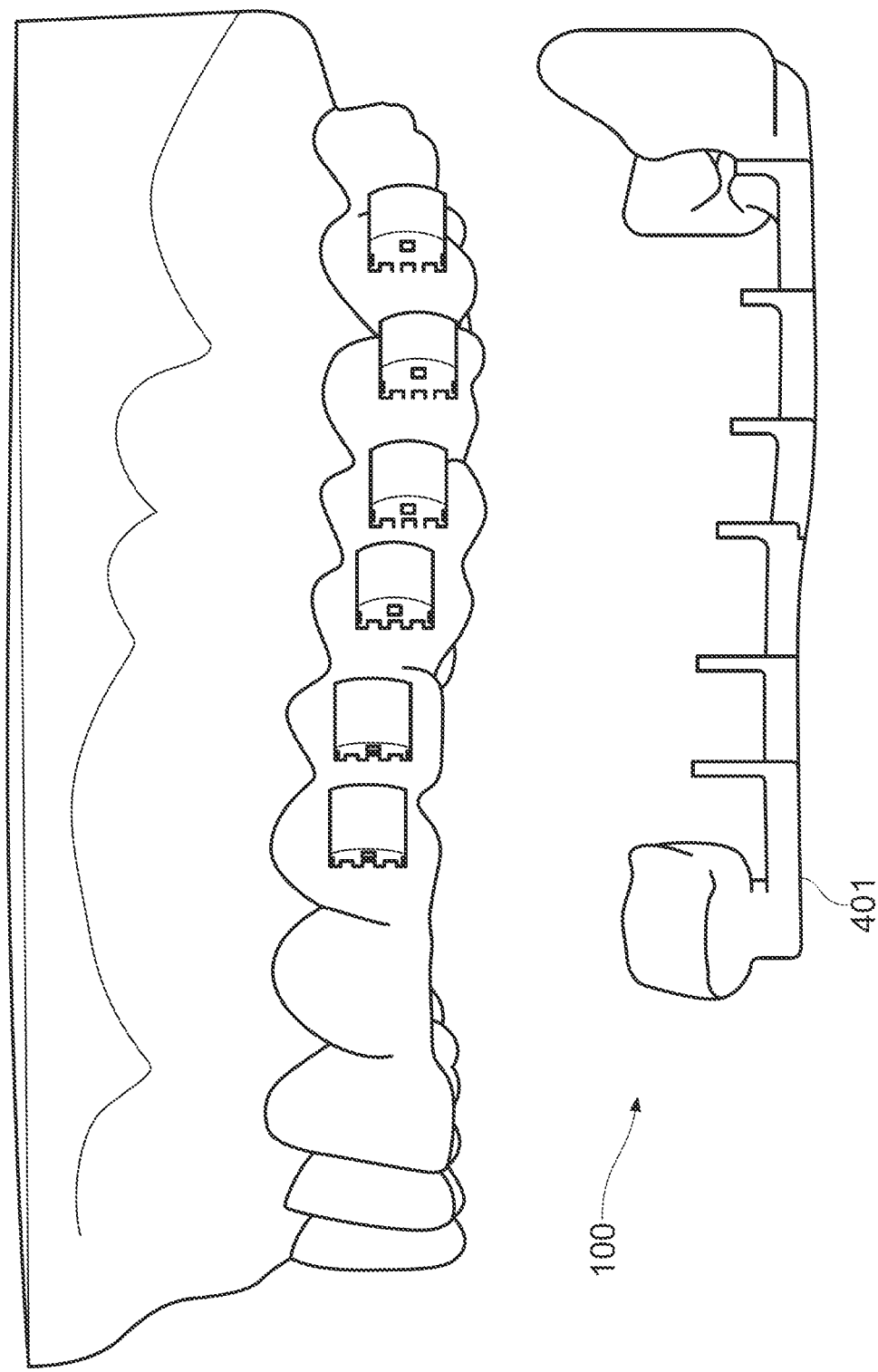
FIG. 4 illustrates the apparatus of FIG. 3 while in use.

Referring now to FIGS. 1 and 4, in use, a curable composition such as a dental adhesive (for example Venus Pearl® by Heraeus Kulzer International) is applied to a tooth facing surface of one or more of the bracket elements. The support body 102 is located proximate to the teeth 104 of a subject e.g. using at least one of the locating elements 106, 107. This may be achieved by positioning the locating elements 106, 107 over respective teeth of a subject. The bracket elements are positioned adjacent to each respective tooth and then bonded to their respective tooth surfaces by curing the curable composition. In the case of a light curing curable composition, this is achieved by applying a dental light for a predetermined period of time.

Once all of the bracket elements have been bonded to the teeth, each of the support arms is cut, snapped or otherwise separated from its respective bracket element. In alternative embodiments, the dental practitioner may separate each bracket element from its respective support arm one by one.

A conventional dental disk cutter fitted with a rubber disk may be used for this step. Once the support arms have been cut, the support body, locating elements and parts of support arm still attached to the support body are removed away from the patient's oral cavity, which leaves the brackets (with small pieces of support arm) bonded to the teeth. This step is illustrated in FIG. 4. The removed piece 401 may be discarded or retained in case one or more of the bracket elements needs re-bonding. The bracket elements may be further shaped to remove any remaining material or sharp edges using an appropriate dental tool.

FIG. 5 illustrates an alternative embodiment of an apparatus 500 in which the support arms 501 comprise a first end portion and a second end portion with an aperture 502 located therebetween. The aperture 502 is aptly integrally formed with the support arm and the support body and is configured to locate a respective bracket element with respect to a respective tooth of a subject. In use, the support body is located with respect to the teeth as described previously. An adhesive is applied to the bracket elements and the bracket elements are passed through the support arm aperture 502, which acts as a locating guide. Once the bracket elements are in contact with a surface of the teeth at a desired location, they can be bonded in position. Finally, the support body, support arms and locating elements are removed from the patient's oral cavity and the bracket elements are finished as described in previous embodiments. The aperture can improve the accuracy with which bracket elements can be positioned by functioning as a guide.

Alternatively to providing locating apertures as part of a support arm, they may be provided as a separate ladder like component. The component fits over the support arms and bracket elements when they are positioned relative to the teeth and comprises a plurality of tooth facing surfaces that are shaped to correspond with surfaces of the teeth. The ladder also comprises a plurality of through holes each of which is shaped to surround a bracket element. The ladder improves the accuracy with which bracket elements can be positioned to the teeth by functioning as a locating guide, but is easily removable after bonding.

Figure 6:
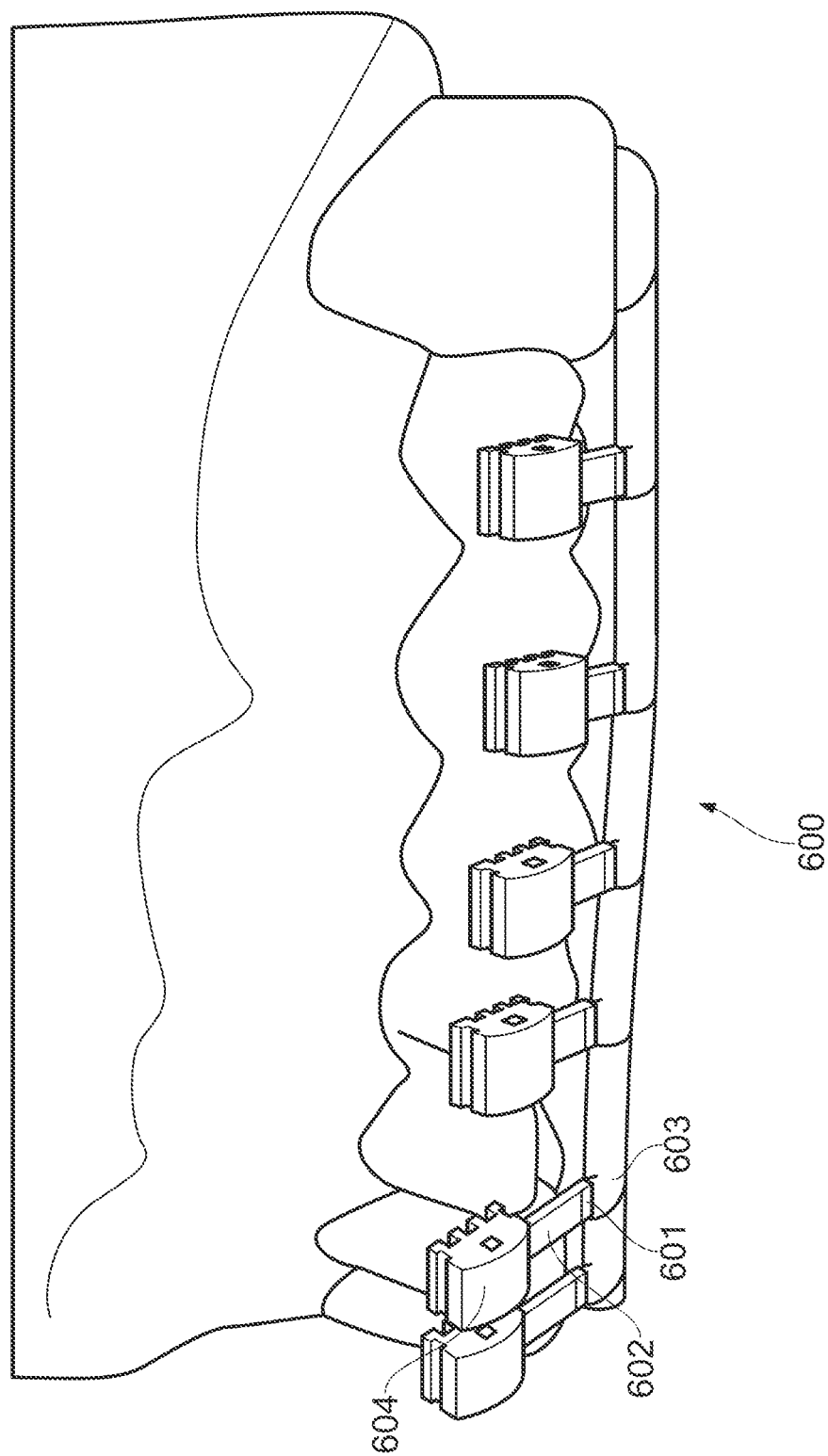
FIG. 6 illustrates an alternative embodiment of the apparatus.

FIG. 6 illustrates an embodiment in which the apparatus comprises at least one hinge portion 601 provided between a support arm 602 and a respective region of the support body 603 adjacent to the support arm 602. The hinge portion 601 may be provided as part of the support arm 602, and may comprise a conventional hinge component, natural/living hinge, or be provided by virtue of the mechanical properties of the hinge portion, e.g. by providing a thinner and/or less stiff material. The hinge portion 601 allows the support arm 602 to be moved relative to the support body 603, which allows a tooth facing surface of the bracket element 604 to be moved in and out of contact with a surface of the tooth. This movement allows adhesive to be applied to the bracket element when it has already been positioned with respect to a tooth. This may prevent smearing of adhesive when the bracket element is positioned, and allows each bracket element to be positioned and bonded individually.

Figure 7:
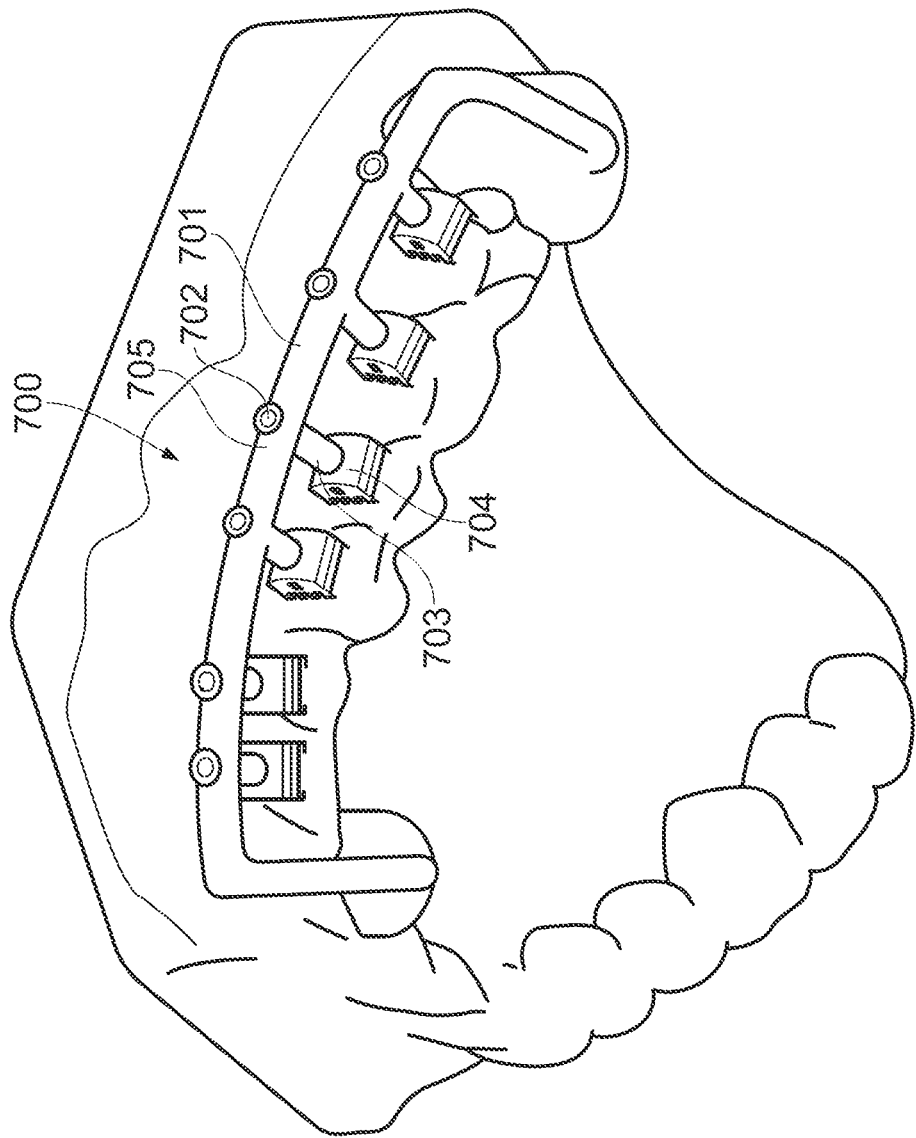
FIG. 7 illustrates an alternative embodiment of the apparatus.
Figure 8:
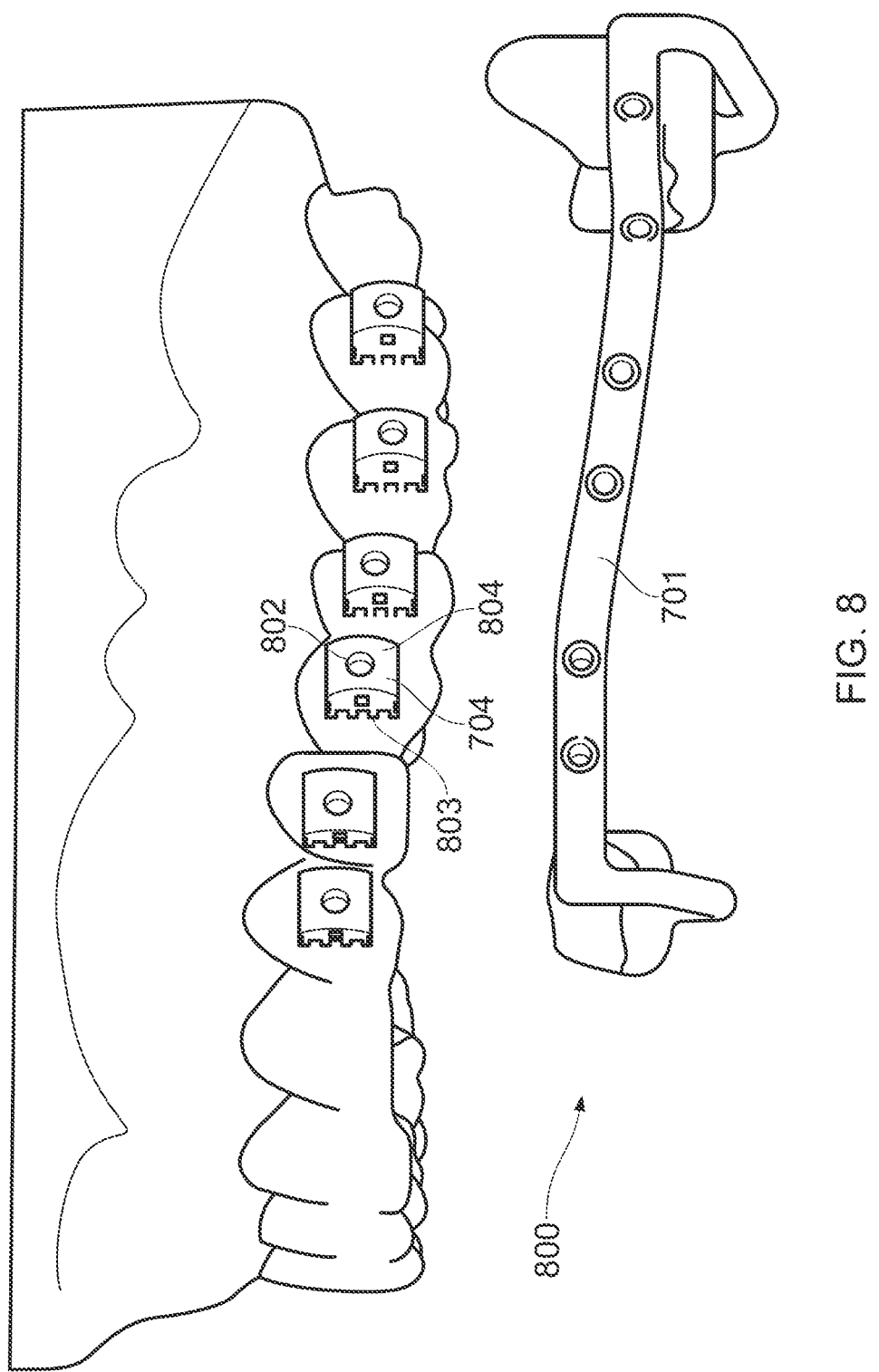
FIG. 8 illustrates the embodiment illustrated in FIG. 7 while in use.

FIGS. 7 and 8 illustrate a further embodiment. The apparatus 700 comprises a support body 701 comprising a plurality of through holes 702. Each through hole 702 is located within a respective support arm 703 and provides a fluid communication passageway between a bracket facing surface 704 and an outer facing surface 705 of the support body 701.

Referring to FIG. 8, there is provided a plurality of bracket elements 704 each of which comprises a through hole 802 for providing a fluid communication passageway between a tooth facing surface 803 and an outer facing surface 804 of the bracket element 801. As shown in FIG. 7, when located adjacent to one another, the through hole of the support body and bracket element 702, 802 provides a fluid communication passageway between an outer facing surface of the support body and a tooth facing surface of the bracket element.

The fluid communication passageways 702, 802 are configured to allow an adhesive composition, such as a curable adhesive composition of a type commonly used in bracket bonding (commonly known as dental composites), to pass through. Aptly, the adhesive may be provided with a lower viscosity than conventional bracket bonding adhesives in order to improve the flow of fluid through the passageways 702, 802.

Depending on the configuration of the support body 701 and bracket elements 801, the through holes 702, 802 may be configured to provide fluid communication between a tooth facing surface of the bracket element and one of the outer facing surfaces of the support body. That is, the fluid communication passageways may be configured to allow fluid to pass through the bracket element in a direction offset from the centre of the bracket element. This may be advantageous to prevent the fluid communication passageway of the bracket element from interfering with other features of the bracket element such as an arch wire passageway.

In use, the support body 701 and bracket elements 704 are positioned relative to the teeth according to previous embodiments. A liquid or substantially liquid adhesive is introduced into the fluid communication passageway of the support body 801, such as by injecting the adhesive with a syringe. The adhesive passes through the fluid communication passageways of the support body and bracket element and comes into contact with a surface of a tooth. The adhesive is then cured, which bonds the bracket element to the tooth as described in previous embodiments. This configuration allows adhesive to be introduced after bracket elements have been positioned with respect to the teeth, which can prevent adhesive from becoming smeared over the teeth during positioning.

Figure 9:
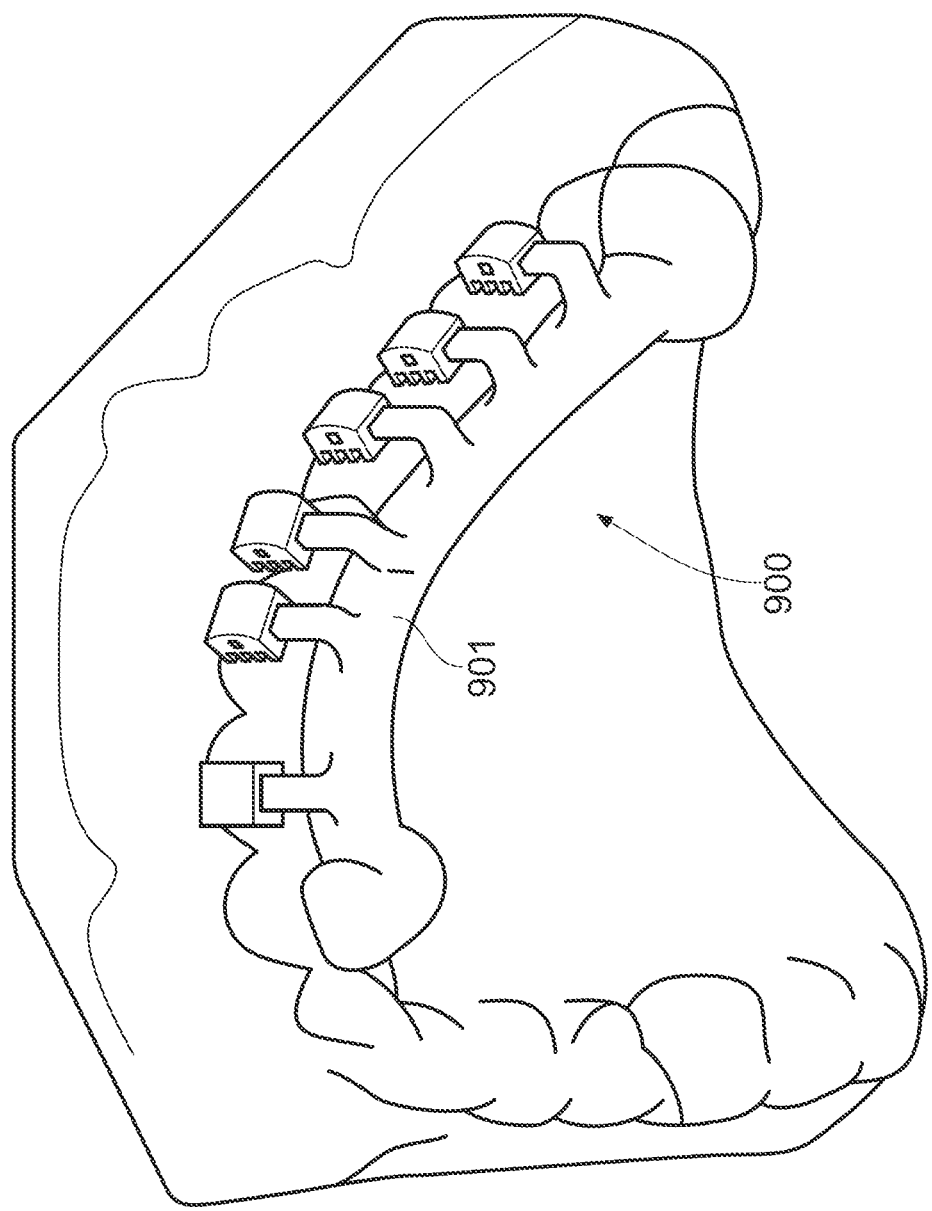
FIG. 9 illustrates an alternative embodiment where the locating element comprises a region of the support body.
Figure 10:
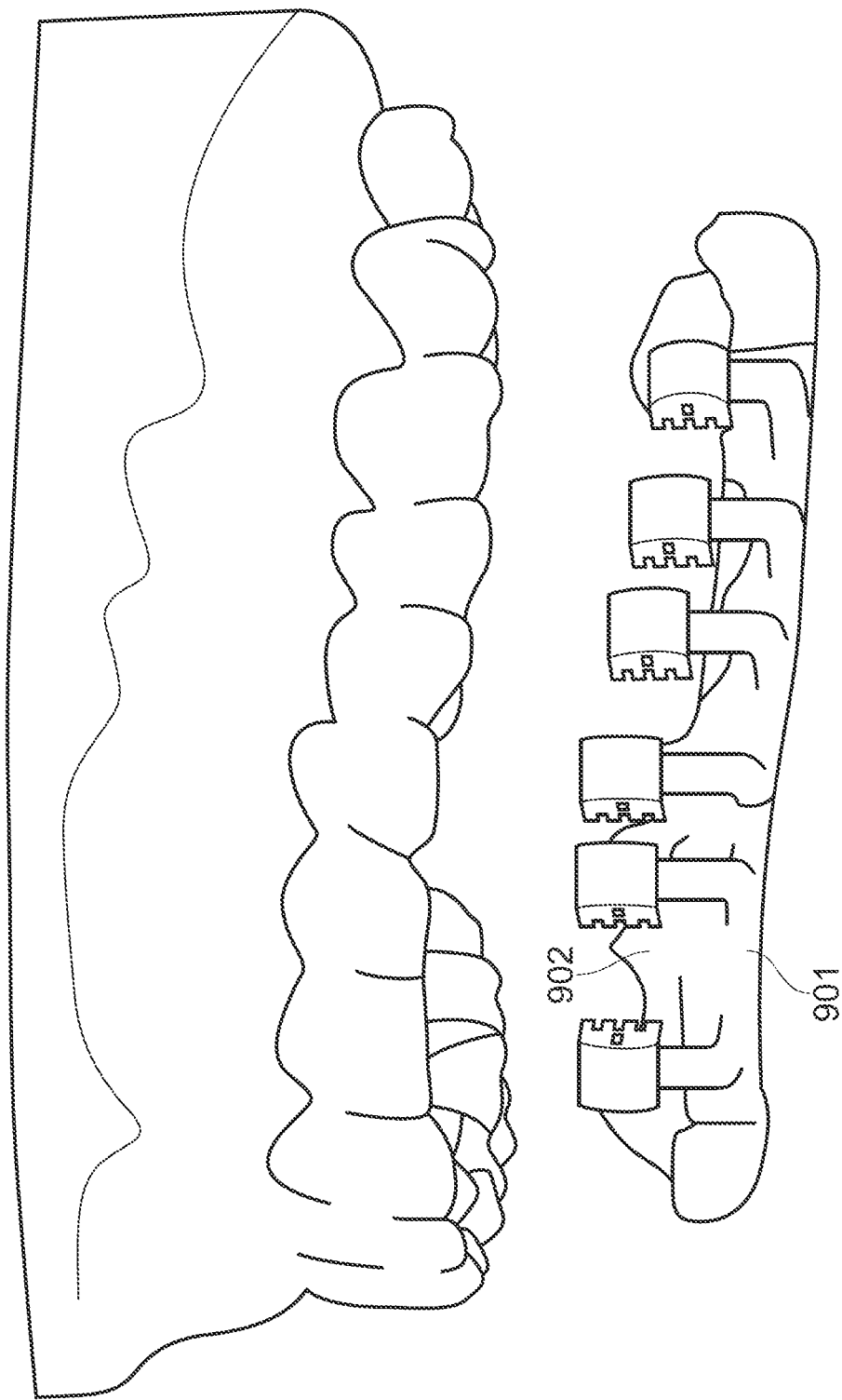
FIG. 10 illustrates the apparatus illustrated in FIG. 9 before being located with the teeth.

FIGS. 9 and 10 illustrate an embodiment where the at least one locating element comprises a region of the support body 901. As shown, the support body 901 has a tooth facing region 902 that is shaped to correspond with a portion of one or more teeth of a subject. That is, the region of the support body may be subject-specific. The tooth facing surface 902 may be located adjacent to the lingual, occlusal or facial surface of the teeth. Providing a locating function as part of the support body improves the accuracy with which bracket elements can be positioned with respect to the teeth because a large and distributed surface of contact with the teeth is provided. This can also help account for flexing in components of the apparatus.

Figure 11:
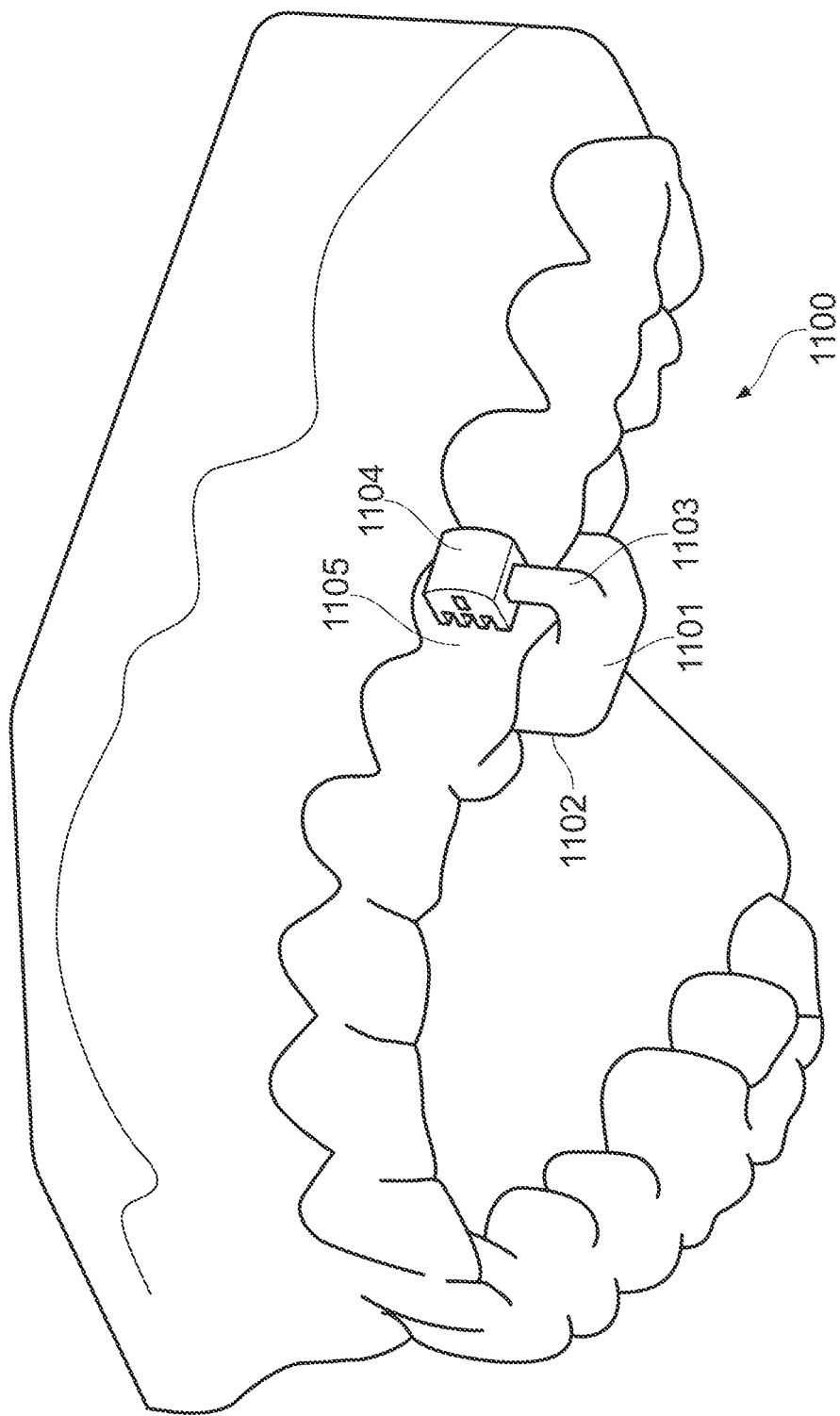
FIG. 11 illustrates an alternative embodiment where a single bracket element is positioned to a single tooth.

FIGS. 11 and 12 illustrate an embodiment wherein a bracket element 1104 is positioned with respect to a single tooth 1105. A support body 1101 is provided which comprises a locating region 1102 which is shaped to correspond with a surface of a tooth of a subject, and a support arm 1103

The apparatus described herein can be manufactured in the following way.

A digital model representing the dental structure of a subject is provided. The digital model may be generated by a scanning technique known in the art, such as scanning a subject's teeth directly using an intra-oral scanner (a suitable scanner is the CS 3500 by Carestream Dental) or scanning a positive or negative impression of a subject's teeth.

A position for one or more bracket elements is provided on the digital model. This position may be determined based on factors such as established bracket positioning guidelines, the nature of the orthodontic treatment to be performed, and the subject's particular dental anatomy. The position may be provided manually by a human or may be performed automatically or semi-automatically. The digital model may also include information relating to the shade and/or colour of the subject's teeth.

The digital model, now including the bracket positioning information, is then used to obtain a configuration for a support body, a plurality of support arms and at least one located element as described herein. This step provides a suitable number and shape of components using the digital model and the bracket position information. This may be performed by a human using known software to manually generate and manipulate the apparatus geometry into a suitable configuration, or may be performed as an automatic or semi-automatic software step. For example, software may be used to generate a shape of a tooth facing surface of a locating element based on the shape of a tooth surface from the digital model.

Existing software may be used to facilitate steps described above, an example of such software is the Digital Indirect Bonding System program provided by OrthoSelect.

The support body, support arms and locating elements are then fabricated according to the configuration obtained. This step may also include fabricating the plurality of bracket elements.

The apparatus may be fabricated as an integrally formed part, i.e. as a single piece. The apparatus may be fabricated using an additive manufacturing process such as fused deposition modelling, stereolithography, sintering e.g. laser sintering, inkjet printing or electron beam melting.

Techniques for producing the apparatus as described herein include, for example, additive manufacturing processes (also known as 3D printing processes). Aptly, this may be a fused deposition modelling, stereolithography, multi-jet modelling, sintering e.g. laser sintering, inkjet printing or electron beam melting process.

Aptly these methods add and bond materials in layers to form objects based on a CAD file. Such technologies are sometimes referred to as free-form fabrication, solid free-form fabrication and layered manufacturing.

Aptly, 3-D inkjet printing parts are built on a platform situated in a bin filled with powder material. An inkjet printing head selectively deposits or "prints" a binder fluid to fuse the powder together in the desired areas. Unbound powder remains to support the part. The platform is lowered, more powder added and levelled, and the process is repeated, all under automated computer control. When finished, the green part is removed from the unbound powder and excess unbound powder is blown off.

In stereolithography, 3-D objects may be constructed from liquid photosensitive polymers that solidify when exposed to ultraviolet light. The object is constructed on a platform that is situated just below the surface of a vat of liquid epoxy or acrylate resin. A low power, highly focused UV laser traces out the first layer, solidifying the model's cross section while leaving excess areas liquid. An elevator incrementally lowers the platform into the liquid polymer. A sweeper recoats the solidified layer with liquid, and the laser traces the second layer atop the first. This process is repeated, all under automated computer control, until the object is complete. Thereafter, the solid part is removed from the vat and rinsed clean of excess liquid. Part supports are broken off and the part is placed in an ultraviolet oven for complete curing.

In fused deposition modelling, filaments of heated thermoplastic may be extruded from a tip that moves in an X-Y plane. A controlled extrusion head deposits very thin beads of material onto a platform to form the first layer. The platform is maintained at a temperature lower than the melting point of the thermoplastic so that the thermoplastic quickly hardens. After the platform lowers, the extrusion head deposits a second layer upon the first layer. Supports may be built during the layering process, which are fastened to the part, either with a second weaker material or with a perforated junction.

Selective laser sintering (SLS) is a powder based process in which a thin layer of powder is deposited in a workspace container and heated to just below its melting point. The powder is then fused together using a laser beam that traces the shape of the desired cross-section. The process is repeated by depositing successive layers of powder and fusing each layer. The area that is not sintered remains as a loose powder that can be easily removed after all the layers have been deposited and fused.

It will be appreciated that other fabrication methods may be suitable to produce the apparatus as described herein.

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A method of positioning two or more bracket elements at a respective desired location proximate to two or more respective teeth of a subject, comprising the steps of:
    locating a support body proximate to two or more teeth of a subject using only a first locating element provided adjacent to a first end portion of the support body and only a further locating element provided adjacent to a further end portion of the support body such that the first locating element and the further locating element solely locate the support body, wherein said step of locating comprises positioning the first locating element over a first tooth or a portion thereof of the subject, and positioning the further locating element over a further tooth or a portion thereof of the subject, wherein the support body supports and is integrally formed with two or more support arms; and
    arranging each support arm to locate a respective bracket element at a desired location with respect to a respective tooth that is different from the first tooth and the further tooth, wherein each support arm is integrally formed with the respective bracket element such that the step of locating the support body comprises positioning the respective bracket element for securing the respective bracket element to the respective tooth,
    wherein the bracket element, the support body, the first locating element, the further locating element and the support arm are formed from a single piece of material.

2. The method according to claim 1, which further comprises securing the respective bracket element to the respective tooth, wherein said step of securing comprises providing a curable composition to a tooth facing surface of the bracket element and curing said composition in a desired location on the tooth facing surface.

3. The method according to claim 1, comprising providing a hinge portion as part of the support arm.

4. The method according to claim 3, comprising providing a plurality of hinge portions, and arranging each hinge portion between the support arm and a respective region of the support body adjacent said support arm.

5. The method according to claim 1, further comprising separating the support arm from the respective bracket element once the bracket element has been secured to the respective tooth.

6. Apparatus for positioning two or more bracket elements at a desired location proximate to two or more respective teeth of a subject, the apparatus comprising:
    a. a support body supporting and integrally formed with two or more support arms, each support arm being arranged to locate a respective bracket element at a desired location with respect to a respective tooth;
    b. a first locating element provided adjacent to a first end portion of the support body and a further locating element provided adjacent to a further end portion of the support body, wherein the first locating element and the further locating element together solely position the support body at the desired location; and
    c. two or more bracket elements, each bracket element comprising a tooth facing surface securable to a surface of a respective tooth,
    wherein the bracket elements, the support body, the first locating element the further locating element and the support arms are formed from a single piece of material.

7. Apparatus according to claim 6, wherein the bracket element is integrally formed with a respective support arm and support body, and wherein the bracket element comprises a tooth-facing surface which comprises at least one characteristic which corresponds to a characteristic of a surface of the tooth of the subject.

8. Apparatus according to claim 7, wherein the tooth-facing surface comprises a contour which corresponds to a contour of the surface of the tooth to which the apparatus is configured to be secured.

9. Apparatus according to claim 7, wherein the bracket element comprises a thickness which is a subject-specific thickness.

10. Apparatus according to claim 7, wherein a location of a passageway of the bracket element is subject-specific, the passageway being configured to accommodate a wire element.

* * * * *